US008266053B2

(12) United States Patent
Crawford et al.

(10) Patent No.: US 8,266,053 B2
(45) Date of Patent: *Sep. 11, 2012

(54) DYNAMIC CREDIT MANAGEMENT (75) Inventors: Stephen P. Crawford, Pacifica, CA (US); Stephanie Evanick, New York City, NY (US); Bryan Seyfried, London (GB); Mark Dilworth, London (GB); Peter Stockman, New York City, NY (US); Michael R. Sutcliff, Alpharetta, GA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,874

(22) Filed: May 17, 2011

(65) Prior Publication Data
US 2011/0218906 A1    Sep. 8, 2011

Related U.S. Application Data (60) Continuation of application No. 12/009,381, filed on Jan. 18, 2008, now Pat. No. 8,015,106, which is a division of application No. 09/999,580, filed on Oct. 31, 2001, now Pat. No. 7,366,693.

(51) Int. Cl.
*G06Q 40/00* (2012.01)
(52) U.S. Cl. ......... 705/38; 705/35; 705/36 R; 705/36 T; 705/37
(58) Field of Classification Search ............... 705/35–38
See application file for complete search history.

(56) References Cited

U.S. PATENT DOCUMENTS

| 3,719,927 | A | | 3/1973 | Michels et al. |
| 4,346,442 | A | | 8/1982 | Musmanno |
| 4,376,978 | A | | 3/1983 | Musamanno |
| 5,136,501 | A | * | 8/1992 | Silverman et al. ............. 705/37 |
| 5,774,553 | A | | 6/1998 | Rosen |
| 5,802,499 | A | * | 9/1998 | Sampson et al. ............... 705/35 |
| 5,946,667 | A | | 8/1999 | Tull, Jr. et al. |
| 6,119,103 | A | | 9/2000 | Basch et al. |
| 6,360,210 | B1 | | 3/2002 | Wallman |
| 6,405,181 | B2 | | 6/2002 | Lent et al. |

(Continued)

FOREIGN PATENT DOCUMENTS
JP       2005021676      1/2005
(Continued)

OTHER PUBLICATIONS

Crouchy et al. "A Comparative analysis of current credit risk models", Journal of Banking & Finance 24 (2000) pp. 59-117.*

(Continued)

*Primary Examiner* — Narayanswamy Subramanian (57) ABSTRACT

A method for providing a financial evaluation of at least one financial instrument or of an issuer supports the provision of a dynamic credit limit. A dynamic credit limit may be associated with a counterparty or a debt security of the counterparty, for example. The method includes obtaining counterparty credit quality data associated with a transaction of the financial instrument between a party and a counterparty. Debt market data is obtained where the debt market data is associated with or relevant to the transaction. A dynamic credit limit is determined for the counterparty or a financial instrument of the counterparty based on at least one of the inputted counterparty credit quality and the obtained debt market data. The dynamic credit limit may be defined in terms of a credit exposure versus time.

20 Claims, 9 Drawing Sheets

U.S. PATENT DOCUMENTS

| | | |
|---|---|---|
| 6,519,574 B1 | 2/2003 | Wilton et al. |
| 6,912,511 B1 * | 6/2005 | Eliezer et al. .................. 705/37 |
| 7,024,386 B1 | 4/2006 | Mills et al. |
| 7,110,972 B1 * | 9/2006 | Handa et al. .................. 705/37 |
| 7,333,950 B2 | 2/2008 | Shidler et al. |
| 7,363,268 B1 | 4/2008 | Howorka |
| 7,366,693 B2 * | 4/2008 | Crawford et al. .............. 705/38 |
| 7,383,224 B2 | 6/2008 | Huennekens et al. |
| 7,613,640 B2 * | 11/2009 | Horsfall ......................... 705/35 |
| 7,693,774 B2 | 4/2010 | Howorka et al. |
| 7,734,540 B2 | 6/2010 | Ramsey |
| 7,742,972 B2 * | 6/2010 | Lange et al. .................... 705/37 |
| 7,822,651 B2 * | 10/2010 | Hume et al. .................... 705/28 |
| 7,827,085 B1 * | 11/2010 | Hochenberger et al. ........ 705/37 |
| 7,848,997 B2 | 12/2010 | Lejdstrom et al. |
| 7,890,398 B2 * | 2/2011 | Miri et al. ....................... 705/35 |
| 8,015,106 B2 * | 9/2011 | Crawford et al. .............. 705/38 |
| 2001/0027437 A1 | 10/2001 | Turbeville et al. |
| 2001/0054003 A1 | 12/2001 | Chien et al. |
| 2002/0007341 A1 | 1/2002 | Lent et al. |
| 2002/0032635 A1 * | 3/2002 | Harris et al. .................... 705/37 |
| 2002/0099641 A1 | 7/2002 | Mills et al. |
| 2002/0128945 A1 * | 9/2002 | Moss et al. ...................... 705/37 |
| 2002/0133455 A1 * | 9/2002 | Howorka et al. ............... 705/37 |
| 2003/0002639 A1 | 1/2003 | Huie |
| 2003/0004866 A1 | 1/2003 | Huennekens et al. |
| 2003/0018561 A1 | 1/2003 | Kitchen et al. |
| 2003/0083933 A1 | 5/2003 | McAlear |
| 2003/0083973 A1 * | 5/2003 | Horsfall ......................... 705/37 |
| 2003/0105711 A1 | 6/2003 | O'Neil |
| 2004/0039658 A1 * | 2/2004 | Hume et al. .................... 705/26 |
| 2004/0128222 A1 | 7/2004 | Tuberville et al. |
| 2004/0243510 A1 | 12/2004 | Hinderer et al. |
| 2006/0242039 A1 | 10/2006 | Haggerty et al. |
| 2008/0301059 A1 | 12/2008 | Ramsey |
| 2010/0216545 A1 * | 8/2010 | Lange et al. .................... 463/26 |
| 2011/0081955 A1 * | 4/2011 | Lange et al. ...................... 463/6 |
| 2012/0022995 A1 * | 1/2012 | Lange ............................. 705/37 |

FOREIGN PATENT DOCUMENTS

| | | |
|---|---|---|
| KR | 1020060122519 | 11/2006 |

OTHER PUBLICATIONS

Authors Unknown, The Changing Nature of Credit Markets, generated by Accenture 2001 2 pages.

Authors Unknown, "21st Century Credit Risk Management," generated by Accenture Mar. 23, 2001 28 pages.

* cited by examiner

DYNAMIC CREDIT MANAGEMENT

RELATED U.S. APPLICATIONS

This application is a continuation of, claims the benefit of, and priority to the copending non-provisional patent application Ser. No. 12/009,381, entitled "DYNAMIC CREDIT MANAGEMENT," with filing date Jan. 18, 2008, which is a divisional of Ser. No. 09/999,580, filed entitled "DYNAMIC CREDIT MANAGEMENT," with filing date Oct. 31, 2001, each of which are hereby incorporated by reference in their entirety.

FIELD OF THE INVENTION

The invention relates to dynamic credit management and the provision of a financial evaluation of at least one financial instrument or an entity.

BACKGROUND OF THE INVENTION

In the prior art, analysts study the financial aspects of business entities and rate securities of the business entities based on their evaluations. For example, analysts may rate the publicly traded securities and private-placement securities of long-term debt, medium-term notes, commercial paper, bank loans, and preferred stock. The ratings are generally defined as a progressive series of discrete classifications. For example, publicly traded debt securities may be rated in accordance with various levels in an investment grade classification or various levels in a junk or high-yield security classification.

With limited resources the analysts attempt to rate accurately the debt securities of numerous business entities, which may be located in the U.S. or overseas. Further, even if adequate resources are available to promptly evaluate the performance of the underlying business entity or its securities, the analysts may want to make sure that temporary or evanescent market conditions are not improperly influencing a rating or a level of a security (e.g., debt security). One or more analyst recommendations and credit ratings may lag actual market conditions because of the limited resources of the analysts or for other reasons. As a result, the variable credit characterizations of debt securities may not be as accurate as they might otherwise be.

In reliance upon such out-of-date or inaccurate analysis, a party to a financial transaction may make decisions that do not reflect true current market conditions or risks in purchasing or selling a particular financial instrument (e.g., debt security). For example, the party may incur vague financial risks as the party approaches or reaches an estimated full credit limit of the counterparty because of uncertainty in the credit capacity of the counterparty. Accordingly, a party, an underwriter of securities or an investment banker may not be able to use the full credit limit of the counterparty in decisions to enter into financial transactions, to hold financial instruments, or to enter into hedging activity. The inability to use the full credit limit of the counterparty may reduce the financial leverage and capital available to corporations, among other things. Thus, a need exists for improving the precision and timeliness of credit evaluations of financial instruments (e.g., debt securities).

SUMMARY OF THE INVENTION

In accordance with the invention, a method for providing a financial evaluation of at least one financial instrument (e.g., debt instrument) or of an entity supports the provision of a dynamic credit limit. A dynamic credit limit may be associated with a counterparty or a debt security of the counterparty, for example. The method includes obtaining counterparty credit quality data associated with a transaction of the financial instrument between a party and a counterparty. Debt market data is obtained, where the debt market data is associated with or relevant to the transaction. A dynamic credit limit is determined for the counterparty or a financial instrument of the counterparty based on at least one of the inputted counterparty credit quality data and the obtained debt market data. The dynamic credit limit may be defined in terms of a credit exposure versus time. Further, the dynamic credit limit may be updated at an update interval or update frequency sufficient to provide an accurate depiction of the dynamic credit limit in the time domain.

A dynamic credit limit is representative of or responsive to changes in the entity (e.g., issuer) or the counterparty that affect the creditworthiness of the entity, the counterparty, or a financial instrument associated with the entity or the counterparty. A party may manage its credit exposure with a counterparty to meet various financial goals. For example, one financial goal may be to minimize unused credit capacity of the counterparty. Accordingly, the counterparty may become fully leveraged or fully funded by debt securities to an extent consistent with the defined dynamic credit limit.

DETAILED DESCRIPTION OF THE INVENTION

Figure 1:
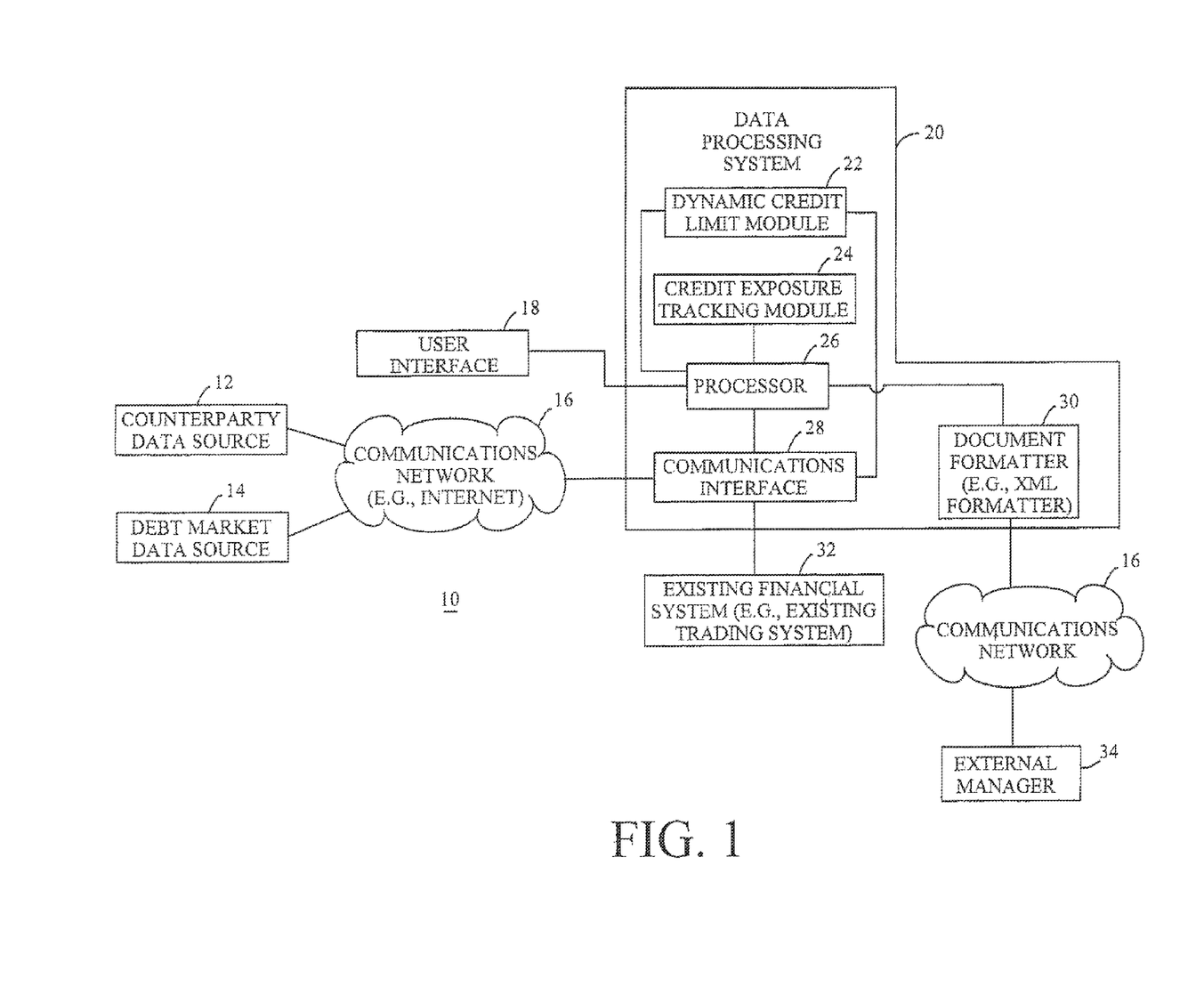
FIG. 1 is a block diagram of a financial system for providing a financial evaluation in accordance with the invention.

In accordance with the invention, the financial system 10 of FIG. 1 supports the provision of a financial evaluation of at least one financial instrument (e.g., a debt instrument), a counterparty, or an issuer. The financial system 10 comprises a data processing system 20. The data processing system 20 is coupled to a user interface 18 which allows a party or user to interact with the data processing system 20. A counterparty data source 12, a debt market data source 14 or both provide information to the data processing system 20 via a communications network 16 or otherwise. The data processing system 20 may communicate with an existing financial system 32 of a party (e.g., an existing trading system or enterprise resource planning system) and an external manager 34. The external manager 34 may be coupled to the data processing system 20 via the communications network 16.

The communications network 16 may comprise the Internet, an intranet, a dedicated link, a virtual private network, an encrypted connection, a secure connection, a data packet network, a circuit-switched network, or another communications link.

The data processing system 20 comprises a dynamic credit limit module 22, a credit exposure tracking module 24, a processor 26, a communications interface 28 and a document formatter 30. The communications interface 28 obtains information from the counterparty data source 12, the debt market data source 14, or both. The communications interface 28 may facilitate communication of the obtained information to the dynamic credit limit module 22.

The dynamic credit limit module 22 supports the determination of a dynamic credit limit based upon at least one of the counterparty data and the debt market data. The dynamic credit limit may be associated with at least one financial instrument (e.g., debt instrument or a hybrid debt-equity instrument), an issuer, or a counterparty. The dynamic credit limit may be updated on a regular interval (e.g., on a weekly basis or a daily basis). The dynamic credit limit may be updated at an update interval or update frequency sufficient to provide an accurate depiction (e.g., high resolution) of the dynamic credit limit in the time domain. In one embodiment, the update interval or update frequency is sufficient to support defining a dynamic credit limit as a continuously variable, numerical credit exposure rating of the counterparty.

The credit exposure tracking module 24 tracks the actual credit exposure of a party with respect to at least one financial instrument, an issuer, or a counterparty associated with a corresponding dynamic credit limit. The credit exposure tracking module 24 may obtain information from one or more of the following: (a) the user interface 18, (b) an existing financial system 32, (c) a database for storing transactional data on previous transactions between a party and a counterparty for an analogous or generally similar financial instrument, (d) a database for storing transactional data or holdings on one or more financial instruments associated with the counterparty or another affiliated issuer, and (e) a planned or prospective transaction of a party concerning a financial instrument of a counterparty. The information available to the credit exposure tracking module 24 and the dynamic credit limit module 22 is preferably synchronized such that the information in the dynamic credit limit module 22 and the credit exposure tracking module 24 is up-to-date with respect to one another.

The processor 26 may accept data from the dynamic credit limit module 22 and the credit exposure tracking module 24 to determine one or more of the following: (a) an available level of credit that may be allocated to the counterparty or an issuer; (b) a representation of a dynamic credit limit associated with at least one financial instrument (e.g., a debt instrument), a counterparty, or an issuer; (c) a representation of credit exposure of a party corresponding to the at least one financial instrument, counterparty or issuer; (d) a maximum dollar amount of financial instruments (e.g., debt instruments) or securities that a party is recommended to transact or purchase from an issuer or a counterparty; (e) an alert or warning that the party's credit exposure meets or exceeds a dynamic credit limit for a counterparty; (f) an alert or warning that the party's credit exposure meets or exceeds the dynamic credit limit for a financial instrument or an issuer for a minimum interval defined by the party; (g) a list of one or more hedging transactions or sales of presently held positions of debt instruments to comply with a dynamic credit limit; or (h) some percentage goal associated with the dynamic credit limit for at least one financial instrument, or for a counterparty or an issuer.

The communications interface 28 of the data processing system 20 facilitates communications between the counterparty data source 12, the debt market data source 14 and the data processing system 20 via the communications network 16. The communications interface 28 may also facilitate communications between the data processing system 20 and an existing financial system 32.

The existing financial system 32 may be a legacy system of a party. For example, the existing financial system 32 may represent a trading system, a brokerage system, an enterprise resource planning system, an enterprise system, or the like. The existing financial system 32 may support a database or an information archive that contains information on the credit exposure of the party to particular corresponding financial instruments (e.g., debt instruments), counterparties, groups of debt instruments, or groups of counterparties. Where the existing financial system 32 can provide such information, such information may be made available to the credit exposure tracking module 24 via the communications interface 28. The existing financial system 32 may also be used to execute hedging transactions or other transactions in one or more financial instruments in accordance with management recommendations determined by the processor 26 of the data processing system 20 or in accordance with preferences entered into the user interface 18 by the party.

The party may interact with the user interface 18 by observing recommendations made by the processor 26, by observing reports of the dynamic credit limit associated with a counterparty, an issuer of a financial instrument, a financial instrument, a portfolio of financial instruments, or an industry segment. The user interface 18 may also facilitate display of a credit exposure or the like. The user interface 18 may comprise a graphical user interface 18 which includes a numerical display or a graphical display of a credit limit in terms of a credit exposure versus time for at least one financial instrument, an issuer or a counterparty. The data processing system 20 and the user interface 18 may provide different access levels for different user groups. For example, the user groups may include traders and credit managers, where credit managers have a greater access to functionality and display screens of the user interface than the traders.

The user interface 18 may display information that the party may use to manage financial transactions and holdings in accordance with the following illustrative examples. In one example, the user interface 18 may display a list of all counterparties for which the party's credit exposure exceeds the dynamic credit limit during a particular time interval (e.g., a day). In another example, the user interface 18 may display a list of counterparties where the party's credit exposure exceeds a certain percentage (e.g., 90%) of the dynamic credit limit. In yet another example, the user interface may support searches by counterparty identifier (e.g., company name), credit exposure, dynamic credit limit, a percentage of a dynamic credit limit, and a percentage that over the dynamic credit limit.

The user interface 18 may facilitate trading, hedging transactions or other activities, the existing financial system 32. The existing financial system 32 may service requests on trading, hedging transactions, and other financial activities.

In an alternate embodiment, an external manager 34 supports trading activities, portfolio management activities, hedging activities or other financial services or management processes that the party does not wish to handle via the data processing system 20 or the existing financial system 32. The circumstances (e.g., equipment unavailability or failure) where the existing financial system 32 is not able to engage in securities trading, hedging, portfolio management or other activities, the external manager 34 may be used to provide such capabilities. The dynamic credit management of the invention lends itself well to outsourcing of some credit risk management via the external manager 34, where costs or quality may be improved. For example, specialized service and transaction providers may have greater economies of scale than internal integrated functionality of the party.

The data processing system 20 may feature a document formatter 30 to support communications to the external manager 34 in the proper format that the external manager 34 can interpret. The document formatter 30 may format dynamic credit limit information, credit exposure information, counterparty data, debt market data, recommendations provided by the processor 26 of the data processing system 20, or other output of the processor 26 of the data processing system 20.

The document formatter 30 may format the information in a format that is compatible for transmission over a communications network 16, such as the Internet. For example, the document formatter 30 may format the foregoing information into a hypertext mark-up language (HTML) document, a standard generalized markup language (SGML) document, an extensible mark-up language (XML) document, or some other file format (e.g., an Internet-compatible file format). HTML refers to a language for creating a document or file, which may be defined by tags and attributes. SGML refers to a system of rules for organizing and structuring (e.g., tagging) elements of a document or a file. XML refers to a specification that supports customized tags on the definition, transmission, validation, and interpretation of data between different applications or different entities. In one embodiment, an XML document or a batch file provided by the document formatter 30 may contain data on at least one counterparty and may be provided on a daily basis.

The format of the document outputted by the document formatter 30 may be specified in accordance with a document type definition (DTD). The document type definition may define how markup tags are interpreted by an application that forms or creates the document. For example, the document type definition may refer to a file that defines the interpretation of markup tags of a standard, generalized markup language (SGML) document, an extensible mark-up language (XML) document, or hypertext markup language (HTML) document.

The external manager 34 accepts the formatted document and may process the document in an agreed upon manner with the party. For example, the party may defer to the judgment or discretion of the external manager 34, which may be controlled by a broker-dealer or investment-banking firm that manages the finances of the party consistent with a discretionary account or by some agreement.

Figure 2:
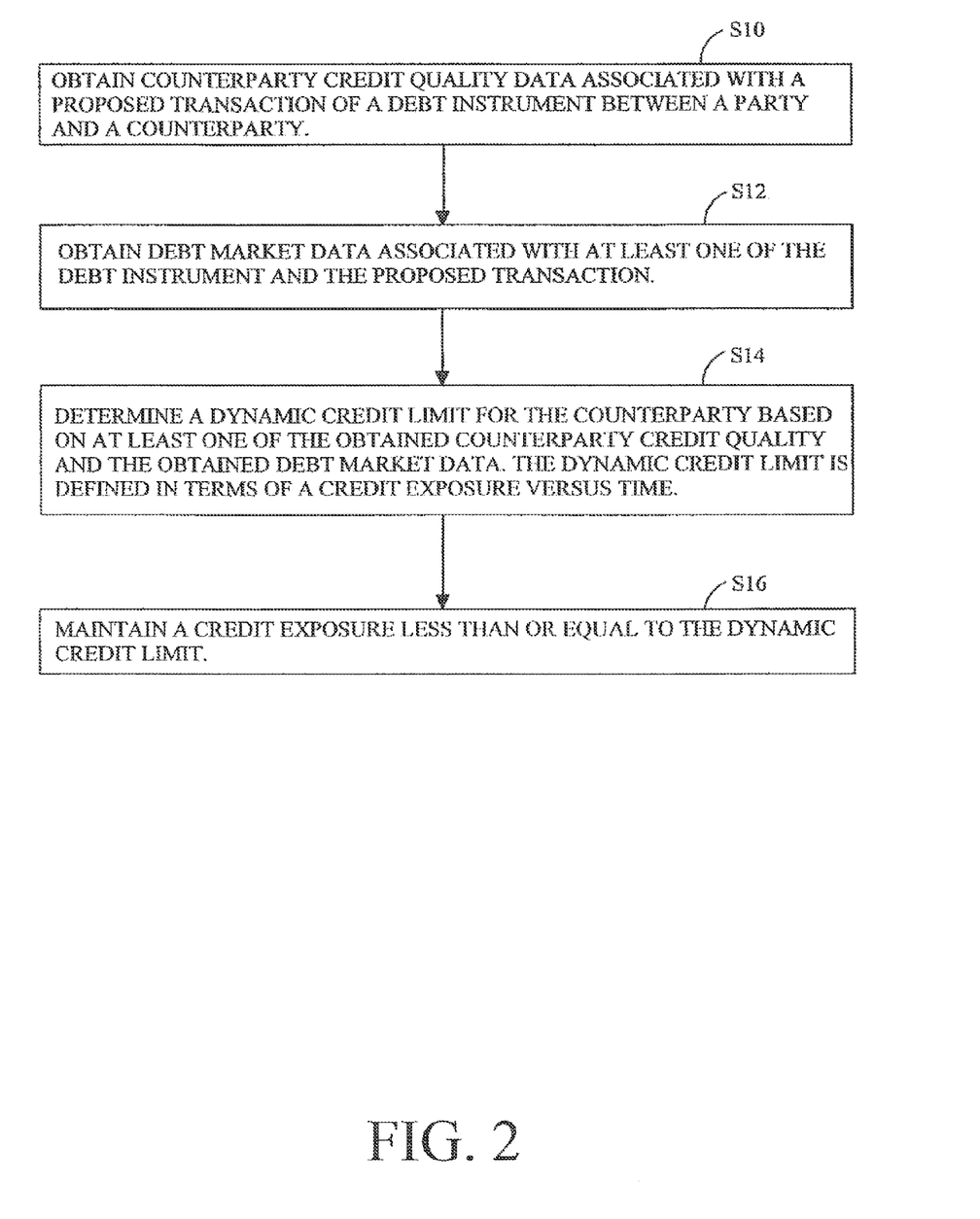
FIG. 2 is a flowchart of a method for providing a financial evaluation of at least one financial instrument, an issuer, or a counterparty in accordance with the invention.

FIG. 2 is a flowchart of a method for providing a financial evaluation of at least one financial instrument (e.g., debt instrument), a counterparty or an issuer. The method of FIG. 2 starts in step S10.

In step S10, the data processing system 20 obtains counterparty credit quality data associated with a proposed transaction of a financial instrument (e.g., debt instrument) between a party and a counterparty. The counterparty credit quality data may comprise data on a counterparty's creditworthiness. Creditworthiness refers to the capacity of a counterparty or another business entity to repay its debt obligations in full and on time. Credit quality data may include credit ratings that express an opinion on the ability of a business entity to meet financial obligations on securities or financial instruments issued by the business entity. The financial commitments may include the payment of interest, preferred dividends, the repayment of principal or other payments on a timely basis.

The counterparty credit quality data may provide an indication of the likelihood of getting money back that is loaned to the counterparty in accordance with the terms agreed to between the party and the counterparty. Credit ratings may not address the risk of loss due to changes in market interest rates or other market considerations. Where the credit quality data concerns a business entity, as opposed to an underlying security of the business entity, the counterparty credit quality data may reflect a financial analysis based upon one or more of the following factors: the adequacy of capital profitability, asset quality, earnings quality, earnings predictability, earnings record, liquidity, strength of balance sheet, regulatory issues in country where the counterparty does business, and currency valuation risks. Market liquidity may be evaluated in terms of one or more of the following: (1) the volume or aggregate currency amount of debt transactions cleared by a clearinghouse, (2) the volume of debt transactions traded by one or more broker dealers, (3) the volume of a particular class of debt transactions.

In one example, the credit quality data may be based, at least partially upon a credit rating issued by an analyst or a credit rating agency, such as Fitch, Standard and Poors, and Moodys. With respect to securities, Fitch may assign investment grade ratings that range from long-term AAA to BBB categories and short-term investment grade ratings that range from F1-F3 to indicate a relatively low probability of default. In contrast, other debt securities may be defined with a speculative, junk bond or non-investment grade categories which may range from long-term BB to D and may include short-term B to D ratings. The non-investment grade ratings may reflect a higher probability of default, or may even indicate that default has already occurred.

The counterparty credit quality data may also include supplemental credit quality data that supplements the credit quality ratings. For example, the supplemental data may include press releases with financial data, security filings that are filed with the Securities and Exchange Commission (SEC) or another financial regulator for public reporting companies and the like. The supplemental data may serve to provide the latest or updated financial information associated with a counterparty, an issuer, or a debt security.

In step S12, following step S10, the data processing system 20 obtains market data associated with at least one of the financial instruments (e.g., debt instruments) in the proposed transaction. Market data may include statistics or financial data on one or more financial instruments that are analogous to or similar to the subject financial instrument. The financial data may include one or more of the following: a volume of debt transactions cleared by a settlement agency during an interval (e.g., a week or a year), a volume of debt transactions traded by one or more broker-dealers during an interval, a volume of debt issued by one or more issuers during an interval, a volume or rate of a particular class of debt transactions during an interval, the currency amount (e.g., dollar amount) of a particular class of transactions of a particular security type executed during an interval, a transactional rate (e.g., volume per unit time) of debt transactions traded by one or more broker-dealers, a transactional rate of debt issued by one or more issuers, a rate of a particular class of debt transactions, a transactional rate of a particular class of transactions of a particular security type, and data indicative of the liquidity of the debt security or other market data.

For example, the obtained debt market data may be used to provide an indication of whether a security or financial instrument is sufficiently liquid with respect to the time horizon or investment horizon of the party who is engaging in a proposed transaction with the counterparty for the particular debt instrument. Even if the credit quality of the counterparty is adequate, the party may refrain from engaging in the transaction if it determines that the liquidity of holding the securities or financial instruments may negatively impact the financial management of the portfolio of securities, or other financial instruments, for example.

In step S14, the data processing system 20 determines the dynamic credit limit for the counterparty based on at least one of the obtained counterparty credit quality and the obtained debt market data. The counterparty credit quality data may be based at least partially upon a debt rating of the counterparty. The debt market data may comprise market liquidity data. The dynamic credit limit is defined in terms of a credit exposure versus time.

The dynamic credit limit may be determined as a continuously variable, numerical credit exposure rating of the counterparty. The dynamic credit limit determination process may use user-configurable parameters consistent with a hierarchical scheme in which user-configurable parameters for counterparties override industry-wide user-configurable parameters. Further, either a counterparty or an industry-wide parameter may override a system default parameter.

In step S14, the dynamic credit limit may be determined in accordance with various alternate equations. Under a first technique for determining the dynamic credit limit in step S14, the dynamic credit limit may be defined by the following equation:

$$D=M/(C+(N*\sigma))$$, wherein D is the dynamic credit limit of the counterparty, M is a maximum risk exposure of a party, C is the credit cost of the party, N is a multiplier, $\sigma$ is a historical standard deviation of C (or $C_{Avg}$) over a defined time interval. The variables M, C, N and $\sigma$ may be derived from or based on counterparty credit quality data, debt market data, or both.

The maximum risk exposure M may be defined in terms of potential financial loss (e.g., a default on one or more debt instruments) of the counterparty that the party is willing to bear. In one embodiment, the maximum risk exposure M is defined over the interval X, and may be referred to as M~ to indicate the temporal dependence. The maximum risk exposure (M) may be based on market data, counterparty credit quality data, or both. The maximum risk exposure (M) may relate to the performance of a counterparty or an industry sector associated with a counterparty. The party may establish the maximum risk exposure (M) to achieve the party's economic objective consistent with the party's business plan, for example.

Credit cost (C) of a party may be based on market data, counterparty credit quality data, or both. In one embodiment, C has a lower limit such that the dynamic credit limit (D) is determined accurately within the lower limit. Further, the credit cost (C) may be averaged to smooth the resultant dynamic credit limit over time (e.g., the dynamic credit limit curve). The average of the credit cost (C) may be designated as $C_{Avg}$.

An averaging duration may be selected as a time period over which the credit cost (C) is averaged. In one embodiment, C is averaged over a defined time interval that is indicated by X days, where X is a positive integer. For example, C may be averaged over a defined time interval within a range from X equal b to 5, where 1 represents one day and 5 represents five days. In another embodiment, C may be averaged over a historical time period of approximately 30 days.

N and $\sigma$ are derived from credit cost data (C) or historical credit cost data. In one embodiment, $\sigma$ represents a historical standard deviation of the credit cost (C) over a defined time interval (e.g., 30 days). The historical standard deviation ($\sigma$) may be multiplied by a volatility multiplier (N) to indicate the historical volatility of the credit cost (C). A higher number of N represents a higher historical volatility, whereas a lower number of N represents a lower historical volatility of the credit cost (C). In one embodiment, N may fall within a range from 2 to 4. In accordance with another embodiment, N has a default value of 2 and a maximum value of 4.

Under a second technique for determining the dynamic credit limit of step S14, the dynamic credit limit may be defined by the following equation:

$$D=M/(V*(\text{Max}(C_{Min}, C_{Avg})+N*\sigma))$$

where wherein D is the dynamic credit limit of the counterparty, M is a maximum risk exposure, V is a multiplicative factor, $C_{Min}$ is the minimum credit cost of the party, $C_{Avg}$ is an average of C over a defined time interval, N is a multiplier, and $\sigma$ is a historical standard deviation of the credit cost C (or $C_{Avg}$) over a defined interval. The term (Max ($C_{Min}$, $C_{Avg}$) indicates a maximum of a function of $C_{Min}$ and $C_{Avg}$. The variables M, C, N and a may be derived from or based on counterparty credit quality data, debt market data, or both. The variables M, $C_{Min}$, $C_{Avg}$, N and $\sigma$ may be derived from or based on counterparty credit quality data, debt market data, or both. The definitions of the variables for the second equation are consistent with like variables of the first equation.

The multiplicative factor V represents a compensation for fluctuation in credit cost. The multiplicative factor (V) counteracts or decreases the dynamic credit limit (D) for an upward trend or change in credit cost (AC) that exceeds a credit cost increase threshold per a defined time interval of the counterparty credit.

The minimum threshold credit cost limit ($C_{Min}$) may prevent distortion of the determination of the dynamic credit limit (D) for small absolute movements in the credit cost (C) in the range where the credit cost approaches zero. The minimum threshold credit cost limit ($C_{Min}$) may be used to determine the value of a multiplicative factor (V) or whether the multiplicative factor is applied to compute the dynamic credit limit.

$C_{Avg}$ is an average of C over a defined time interval (e.g., X-day average credit cost, where X is any positive integer). In one example, $C_{Min}$, X, and N are preferably nonnegative integer values. $C_{Min}$ may fall within a range from 0 to 50, X may fall within a range from 1 to 5, N may fall within a range from 0 to 4 and V may be selected based on an historic level of increase in credit costs. Although $C_{Min}$, X, and N may have values that are definable by a user, $C_{Min}$, X, and N may have the following default values of 0, 1, and 2, respectively.

The value of the multiplicative factor (V) depends upon one or more of the following factors: (1) an evaluation of credit cost increase (e.g., AC) per a time interval and (2) whether or not the observed credit cost (C) is less than, equal to, or greater than a minimum credit cost ($C_{Min}$). In one example, the value of the multiplicative factor (V) is one by default, where the observed credit cost (C) is less than or equal to the minimum credit cost ($C_{Min}$). If the observed credit cost (C) is greater than the minimum credit cost ($C_{Min}$), the value of V may deviate from one based on the evaluation of credit cost increase over a time interval.

The value of V may be set to 1.5 if the credit cost (e.g., average credit cost) increases by approximately ten percent in one day and if the credit cost (e.g., C or $C_{Avg}$) is greater than the minimum credit cost ($C_{Min}$). The value of V may be set to 1.5 if the credit cost increases by approximately twenty-five percent in five days and if the credit cost (e.g., C or $C_{Avg}$) is greater than the minimum credit cost ($C_{Min}$). The value of V may be set to 2 if credit cost increases by approximately fifty percent in five days and credit cost is greater than the minimum credit cost. In sum, the value of the multiplicative factor V is selected based on the extent of increase in credit costs (e.g., average credit cost) per a certain time interval. In one embodiment, the multiplicative factor V is applied to a function of the minimum credit cost ($C_{Min}$) and the average credit cost to determine the dynamic credit limit.

In step S14, the dynamic credit limit (D) may be updated daily or at another suitable time interval in response to changes in one or more of the following: counterparty credit quality, credit market liquidity, M, V, C, $C_{Min}$, $C_{Avg}$, N and σ. The dynamic credit limit (D) may provide a numerical measure of risk that reflects a precise, timely view of credit quality of a counterparty, industry sector, a governmental entity, or a defined portfolio of financial instruments.

In step S16, after step S14, the data processing system 20 supports a party's maintenance of a credit exposure less than or equal to the determined dynamic credit limit for a particular financial instrument, a particular counterparty, a particular issuer, a portfolio of financial instruments, or an industry sector. The maintenance of the party's credit exposure, less than or equal to the dynamic credit limit, may be carried out with respect to a proposed financial transaction, a proposed securities transaction, the holding of financial instruments, or the holding of securities.

In one example, the party decides to engage in a proposed transaction if the party's actual credit exposure associated with the counterparty is less than the dynamic credit limit of the counterparty or up to some target percentage (e.g., 90 percent) of a dynamic credit limit. The target percentage of less than the dynamic credit limit provides the user with a financial cushion to handle market fluctuations or other financial conditions.

In another example, the data processing system 20 informs the user of a decision to hold debt instruments of the counterparty at least up to the indebted credit limit.

In yet another example, the data processing system 20 is arranged to hedge excessive credit exposure above the dynamic credit limit that exceeds the dynamic credit limit for at least a minimum threshold duration (e.g., one day). The minimum threshold duration may be a time period defined by the user, for example.

In accordance with yet another example, the data processing system 20 supports maintenance of a credit exposure less than or equal to the dynamic credit limit by engaging in one or more transactions to reduce excessive credit exposure above the dynamic credit limit that exceeds the dynamic credit limit for at least a minimum threshold duration. For example, the excessive credit limit exposure may be reduced or eliminated by hedging excessive credit exposure above the dynamic credit limit that exceeds the dynamic credit limit for at least a minimum threshold duration. The excessive credit exposure may be hedged by engaging in transactions in derivatives, for example.

In an alternative configuration of step S16, the data processing system 20 may support managing debt risk of a debt portfolio including the financial instrument or credit activities of the counterparty by interpreting a file containing counterparty data, debt market data, transactional data, and debt holdings data.

Figure 3:
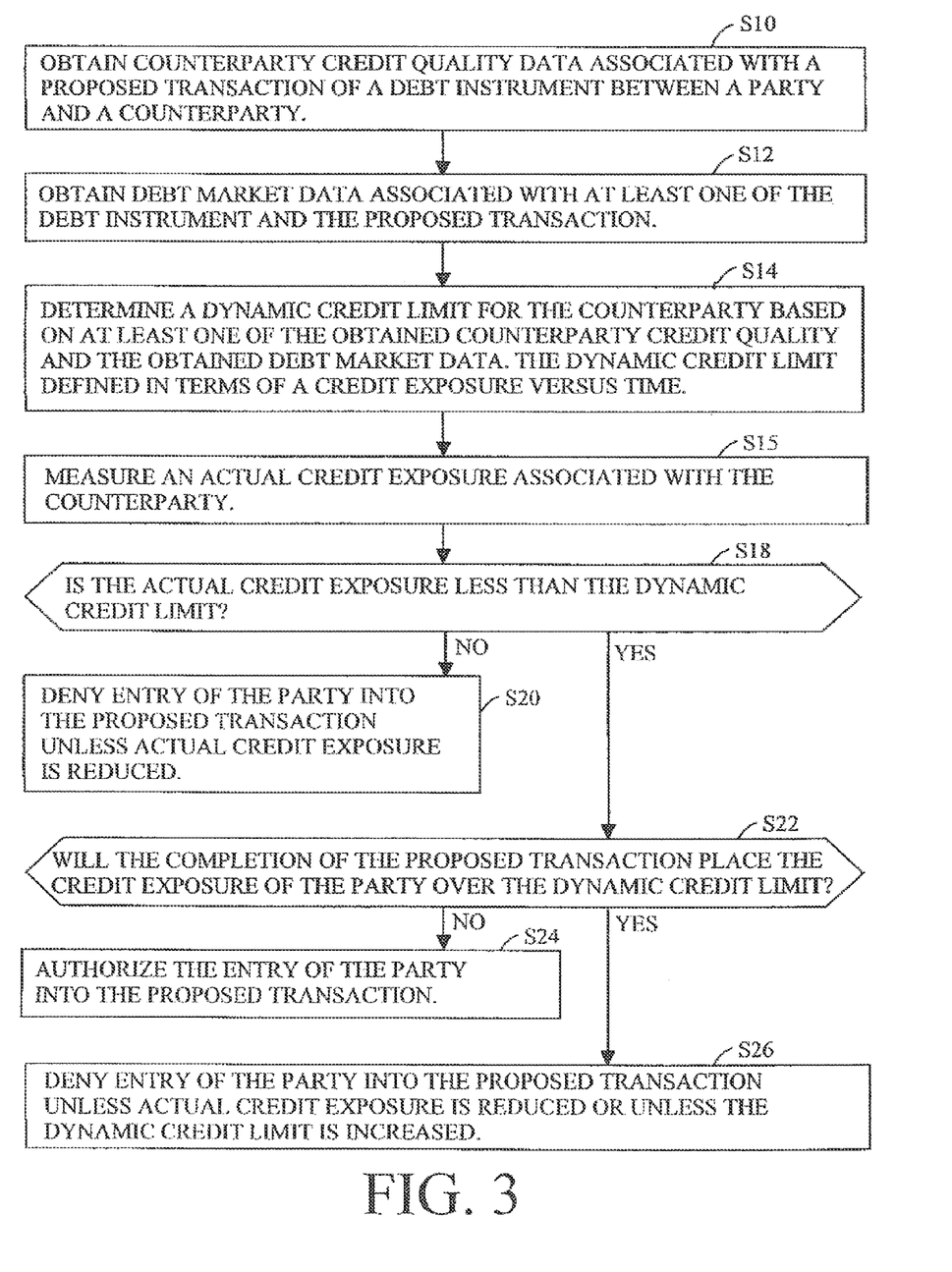
FIG. 3 is a block diagram of a method for managing a transaction based upon a financial evaluation and in accordance with the invention.

FIG. 3 shows a flowchart of a method for providing a financial evaluation of at least one financial instrument (e.g., debt instrument) of a counterparty or an issuer. Like reference numbers in FIG. 2 and FIG. 3 indicate like steps or procedures.

Steps S10 through S14 of FIG. 3 have already been explained in conjunction with FIG. 2. Accordingly, the explanation of FIG. 3 starts by considering step S15. In step S15, a party's actual credit exposure is measured or determined. The actual credit exposure is associated with a counterparty or financial instrument of a counterparty. For example, the data processing system 20 determines an actual credit exposure of a party based on historic transactional data. Historic transactional data may be retrieved from the existing financial system 32 or elsewhere. The actual credit exposure refers to an observed or determined credit exposure of a party with respect to the counterparty.

In step S18, the processor 26 of the data processing system 20 determines if the actual credit exposure is less than the dynamic credit limit. If the actual credit exposure of a party is not less than the dynamic credit limit, then the method continues in step S20. However, if the actual credit exposure is less than the dynamic credit limit, then the method continues in step S22.

In step S20, the data processing system 20 may deny entry of the party into the proposed transaction unless the actual credit exposure of the party is reduced. The denial of entry of the party into the proposed transaction may be embodied as an alert that is displayed on a display of the user interface 18. The alert may provide an explanation that the actual credit exposure is not less than the dynamic credit limit. Alternately, the alert may provide the level of the actual credit exposure and the level of the dynamic credit limit. In one embodiment, the user interface 18 may be able to override the denial of entry of the party into the proposed transaction.

In step S22, the data processing system 20 determines if the completion of the proposed transaction would place the credit exposure of the party (with respect to the counterparty) over the dynamic credit limit. If the completion of the proposed transaction would not place the credit exposure of the party over the dynamic credit limit, the method continues in step S24. However, if the completion of the proposed transaction places the credit exposure of the party over the dynamic credit limit, then the method would continue in step S26.

In step S24, the data processing system 20 authorizes the entry of the party into the proposed transaction. The authorization of the entry of the party into the proposed transaction may be embodied as an alert on a display or user interface 18 that informs the user party of the financial consequences of entering into the transaction.

In another embodiment, the communications interface 28 may transmit an authorization code and transactional data to the existing financial system, which may then execute the transaction.

In yet another embodiment, the document formatter 30 may support the formation and transmission of a document or another data structure that contains an authorization code and transaction data for execution of a proposed transaction by the external manager 34.

In step S26, the data processing system 20 denies entry of the party into the proposed transaction unless an actual credit limit exposure is reduced or unless the dynamic credit limit is increased. The actual credit exposure refers to the credit exposure of the party and is generally under the control of the party to reduce it by engaging in transfers of financial instruments (e.g., debt securities) of the counterparty or other financial instruments that are relevant to the proposed transaction. For example, other financial instruments that are relevant to the transaction may include the securities of entities in the same industry sector as the counterparty. The party may also engage in hedging activity for the purchase of derivatives to reduce the actual credit exposure to an acceptable level such that the proposed transaction may take place in step S26.

On the other hand, the dynamic credit limit is under the control of the counterparty to a certain extent. The counterparty may wish to enter into the transaction and may take steps to improve its dynamic credit limit. For example, the counterparty may take one or more of the following actions to increase its dynamic credit limit: issuing more equity securities to reduce outstanding debt load on the company, retiring callable securities prior to their maturity dates, and obtaining the infusion of capital from a merger or acquisition to facilitate completion of the proposed transaction.

Figure 4:
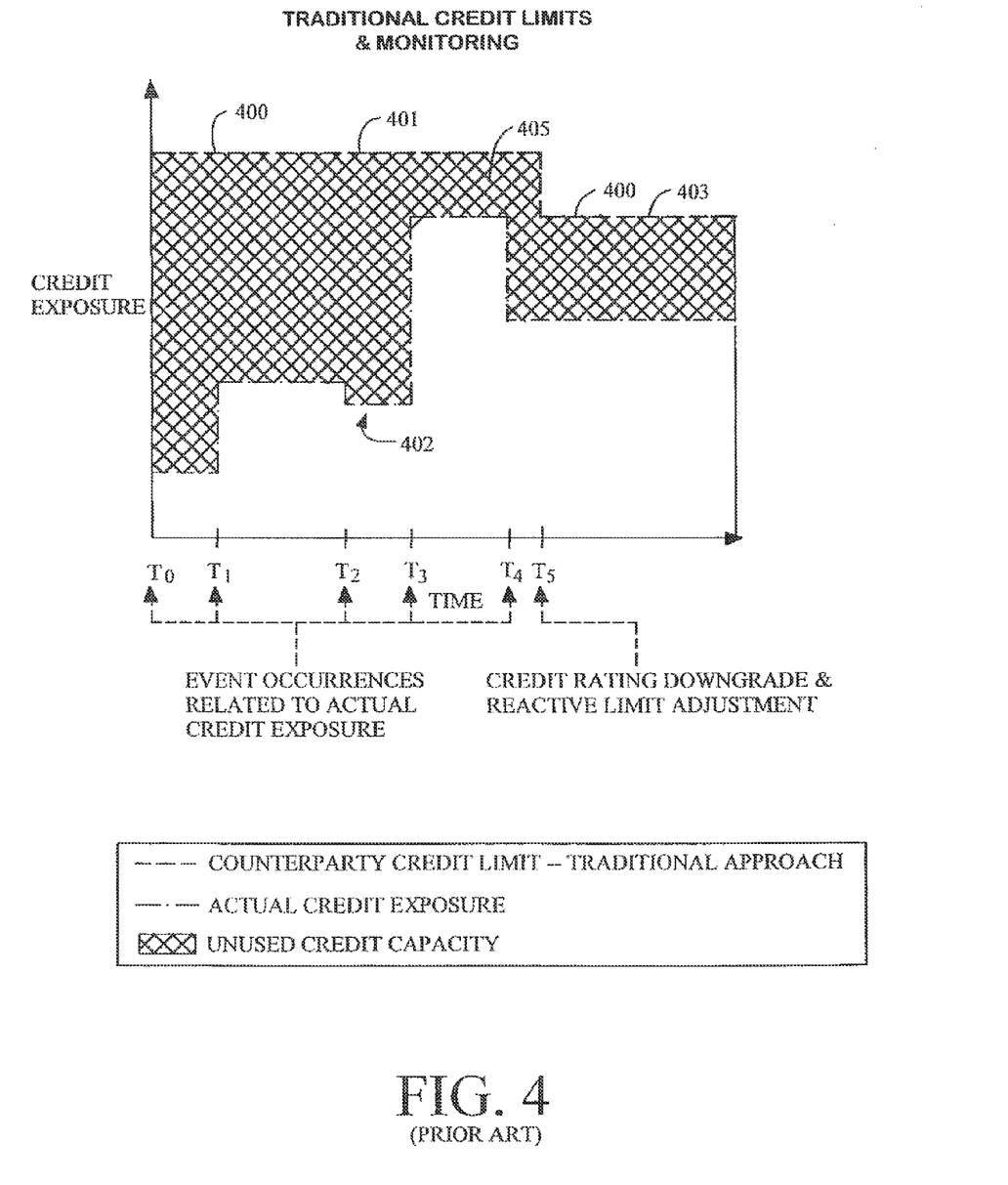
FIG. 4 is a graph of credit exposure versus time in accordance with a traditional credit limit determination of the prior art.

FIG. 4 shows a graph of credit exposure versus time for a prior art scheme for credit limit determination and monitoring. The vertical axis of FIG. 4 represents credit exposure of a party, whereas the horizontal axis of FIG. 4 represents time. The dashed upper line 400 represents a conventional counterparty credit limit as defined by a counterparty credit rating, for example. The conventional counterparty credit limit is at a higher level 401 from time T0 to time $T_5$, whereas the conventional counterparty credit limit is at lower level 403 for time greater than $T_5$ in the illustrative example. The credit limit only makes one transition at $T_5$, as illustrated, which is consistent with the idea that traditional counterparty credit limits are updated by analysts on a sometimes infrequent basis. For example, as illustrated the transition $T_5$ may coincide with a major corporate disclosure (e.g., a Form 8-K filing with the SEC), the occurrence of an event, or a predetermined lapse of time may lead an analyst to update the traditional counterparty credit limit.

The actual credit exposure of the party is indicated by the dot-dash line 402 below the dashed upper line 400 of the conventional counterparty credit limit. The actual credit exposure has actual transitions at time $T_1$, $T_2$, $T_3$ and $T_4$. Actual transitions may occur at various times that do not necessarily coincide with major corporate disclosures, events, 'or analyst reviews. Accordingly, as illustrated the actual credit exposure of the dot-dash line 402 varies more than the traditional counterparty credit limit of the dashed upper line 400.

The cross-hatched area 405 of FIG. 4 indicates unused credit capacity of the counterparty. The unused credit capacity of the counterparty may represent a lost business opportunity to the party opposite the counterparty in the bargaining process or a transaction. The cross-hatched area 405 lies between the traditional counterparty credit limit and the level of the actual credit exposure. The counterparty may want to maximize its leverage or maximize its ability to borrow capital to fund its business and activities by minimizing its unused credit capacity.

Figure 5:
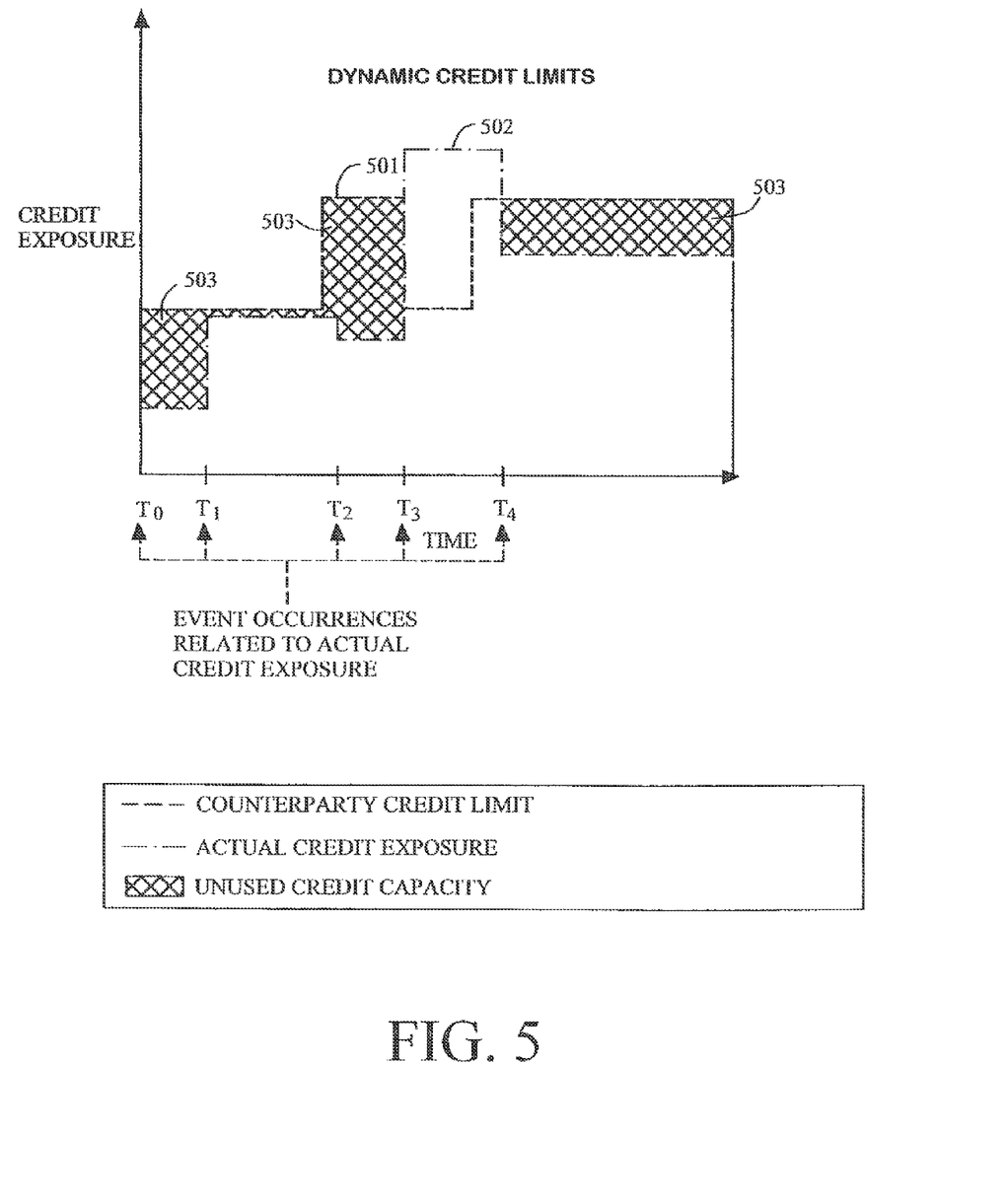
FIG. 5 is a graph of credit exposure versus time in accordance with a dynamic credit limit determination consistent with the invention.

FIG. 5 is a graph that illustrates credit exposure versus time in accordance with the invention. The dynamic credit limit is indicated by the dashed line 501 or trace, as shown in FIG. 5. The actual credit exposure is indicated by the dash-dot line 502 or trace of FIG. 5. The cross-hatched region 503 between the counterparty dynamic credit limit line (501) and the actual credit exposure line (502) indicates the unused credit capacity of the counterparty.

In general, the dynamic credit limit may be updated at an update interval or update frequency sufficient to provide an accurate depiction of the dynamic credit limit in the time domain. For example, in one embodiment the counterparty credit limit fluctuates with a frequency that is commensurate with or highly correlated to the frequency of variation of the party's actual credit exposure. Accordingly, the counterparty credit limit provides a more realistic and variable view or snap shot of the counterparty's financial creditworthiness on an instantaneous basis than the traditional approach of FIG. 4. Because the dynamic credit limit is updated with a commensurate update frequency to the frequency of variation of the actual credit exposure, the unused credit capacity of the counterparty may be reduced or minimized in the graph of FIG. 5 in comparison to the graph of FIG. 4. In one embodiment, the update interval or update frequency is sufficient to support defining a dynamic credit limit as a continuously variable, numerical credit exposure rating of the counterparty. A continuously variable dynamic credit limit may be represented graphically as a sloped line or a curved line plotted on a graph of credit exposure versus time.

In accordance with the dynamic credit management system and method of the invention, the precision and timeliness of the dynamic credit limit reduces or eliminates the unused credit capacity of the counterparty. The availability of the dynamic credit limit enables a party to make a better and more accurate decision on whether or not to engage in a transaction with the counterparty. Further, the dynamic credit limit may provide insight for the party on how to manage the portfolio of one or more financial instruments (e.g., debt securities) of the counterparty or another issuer. The improved dynamic credit limit determination allows both the party and the counterparty to benefit. The counterparty may be able to use its credit capacity to the greatest extent possible within the dynamic credit limit range and the party may be able to better manage transactions and holdings that relate to the counterparty credit limit.

Figure 6:
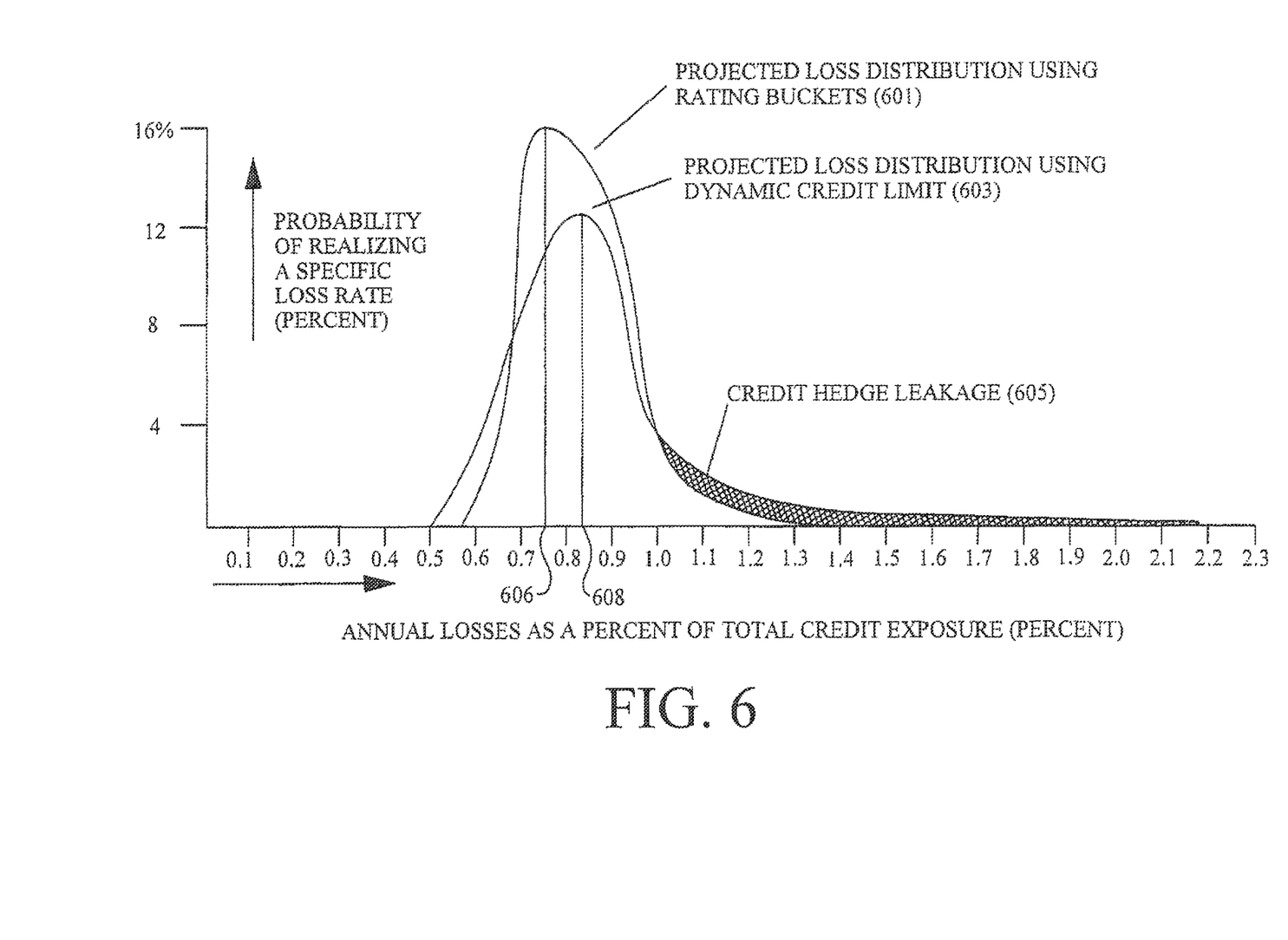
FIG. 6 is an illustrative graph of party's probability of realizing a specific loss rate versus a party's annual losses as a percent of total credit exposure.

FIG. 6 is an illustrative graph of a party's probability of realizing a specific loss rate versus annual losses as a percent of total credit exposure (e.g., rating buckets). The vertical axis represents the probability of realizing a specific loss rate, whereas the horizontal axis represents the annual losses as a percentage of total credit exposure. The numbers or percentage values on the horizontal and vertical axes of FIG. 6 are for illustrative purposes. Actual numbers or percentage values may differ from those shown in FIG. 6, while still falling within the scope of the invention.

FIG. 6 includes two curves (601, 603). The first curve 601 represents projected loss distribution of a party using a traditional credit rating system. The second curve 603 represents a projected loss distribution of a party using a dynamic credit limit evaluation in accordance with the invention. As illustrated, the first curve 601 has a higher peak probability of realizing a specific loss rate than the second curve 603. At the peak probabilities, a party who uses the traditional credit rating system may experience a corresponding lower annual loss 606 than the higher annual loss 608 of a party who uses the dynamic credit limit. Nevertheless, the party who uses the traditional credit rating system may tend to engage in unnecessary hedging activity, as indicated by the cross-hatched region of credit hedge leakage 605. The unnecessary hedging activity may result from outdated market information or poor resolution levels associated with discrete financial ratings, for example. Where the party uses the dynamic credit evaluation, the party has timely financial information available to make well-informed decisions about risk retention and hedging of debt instruments of a particular counterparty, industry sector, country, or defined portfolio.

Figure 7:
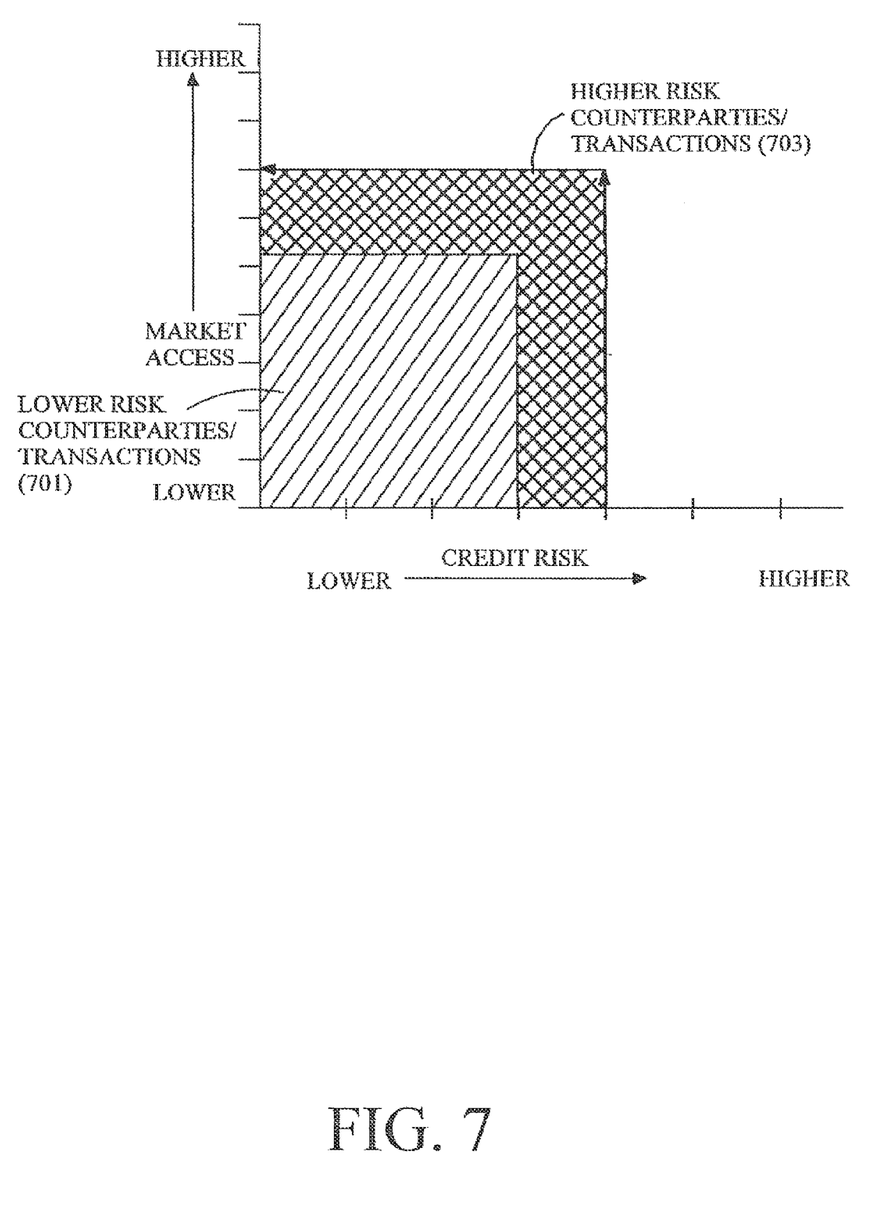
FIG. 7 is a graph that illustrates market access versus credit risk.

FIG. 7 is a graph that illustrates market access versus credit risk. The vertical axis represents market access, whereas the horizontal axis represents credit risk. Market access may be defined in terms of a percentage of a relevant market, such as counterparties with a certain capitalization or credit rating in a defined geographic region (e.g., the United States).

In FIG. 7, one cross-hatched rectangular region indicates a lower risk operating region 701 for a party, whereas the other cross-hatched rectangular region indicates a higher risk operating region 703 for the party. The lower risk operating region 701 corresponds to lower market access of the party. In contrast, the higher risk operating region 703 is associated with a greater market access of the party. In one example, the lower risk operating region 701 represents transactions and counterparties associated with investment grade securities or financial instruments. Further, the higher risk operating region 703 represents transactions and counterparties that are not limited to investment grade financial instruments.

The party may hedge the increased risk attendant with the transition from the lower risk operating region 701 to the higher risk operating 703 region. For example, the party may hedge the incremental risk using swaps or other derivative products. In one embodiment, the cost of the hedging is equal to or less than the cost of the incremental credit risk. Accordingly, the party can service credit risks that are poorer or greater than those associated with investment-grade counterparties to broaden the party's revenue base.

Figure 8:
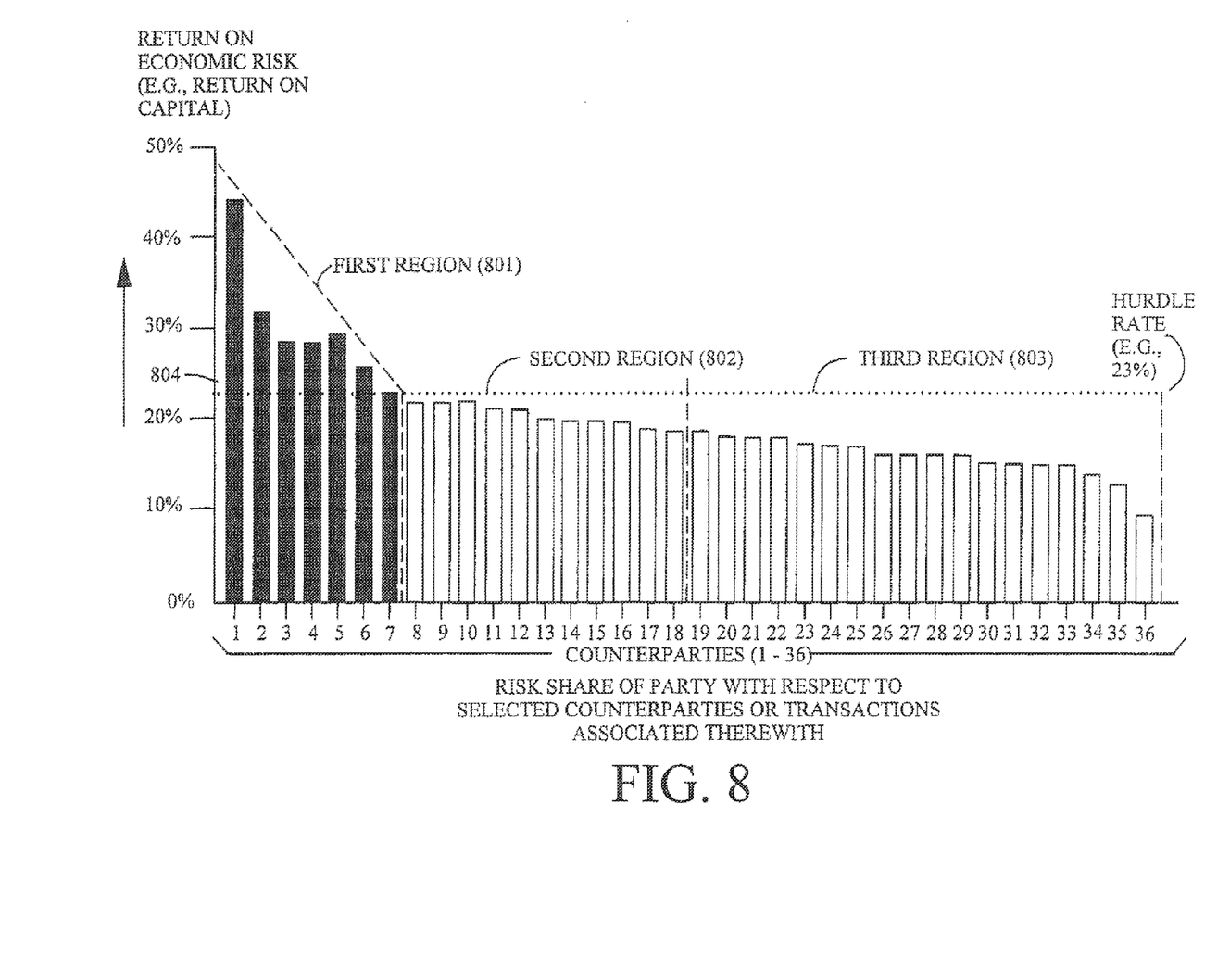
FIG. 8 is a chart that shows a party's return on economic risk versus a party's risk share associated with various counterparties.

FIG. 8 is a chart that shows return on economic risk versus risk share. The vertical axis represents return on economic risk for a party, whereas the horizontal axis represents risk share associated with counterparties. In one embodiment, the return on economic risk may refer to a return on capital for a party. Further, the risk share may be associated with one or more counterparties or transactions affiliated with corresponding counterparties, as indicated on the horizontal axis. In an alternate embodiment, the horizontal axis may reflect incremental risks associated with representation of different counterparties in the portfolio.

In FIG. 8, a first region 801 indicates a region where the party's return is above the hurdle rate 804. The hurdle rate 804 is indicated by a dotted horizontal line. The hurdle rate 804 represents a critical threshold of return (e.g., a 23 percent return on capital as shown in FIG. 8) on a party's economic risk. If the party's return associated with a counterparty is above the hurdle rate 804, the party may seek to engage in a transaction with the counterparty. Although the return on economic risk for 36 counterparties is shown by the 36 bars in the bar graph of FIG. 8, the return on economic risk may be indicated for any number of counterparties and still fall within the scope of the invention.

A second region 802 indicates a region where the party's return is below the hurdle rate 804, but the departure below the hurdle rate is curable by the party's taking certain actions or countermeasures. If the return is below the hurdle rate 804, the party may refrain from entering into the transaction, unless the party can increase its spread relative to the risk to move the party's return above the hurdle rate 804. In other words, the party may refrain from entering into a transaction with a particular counterparty in the second region 802 unless the transaction associated with the particular counterparty could be moved to fall within the first region 801. In one embodiment, the party may enter into a transaction with a counterparty, where the return is lower than a hurdle rate 804 because the party can reduce economic exposure and thereby rise above the hurdle rate 804 by performing at least one of the following activities: syndication of debt instruments from multiple counterparties, swapping credit risk with a third party, and repricing of the transaction with the counterparty, and repricing of the credit risk with the counterparty.

A third region 803 represents a region where the party's return is below the hurdle rate 804 and the deficiency in the hurdle rate cannot be corrected by the party's adoption of any countermeasures. In other words, a counterparty in the third region 803 or a transaction associated therewith cannot be moved into the first region 801 by the party's adoption of countermeasures. Accordingly, the party may refrain from entering into transactions associated with counterparties that fall within the third region.

Figure 9:
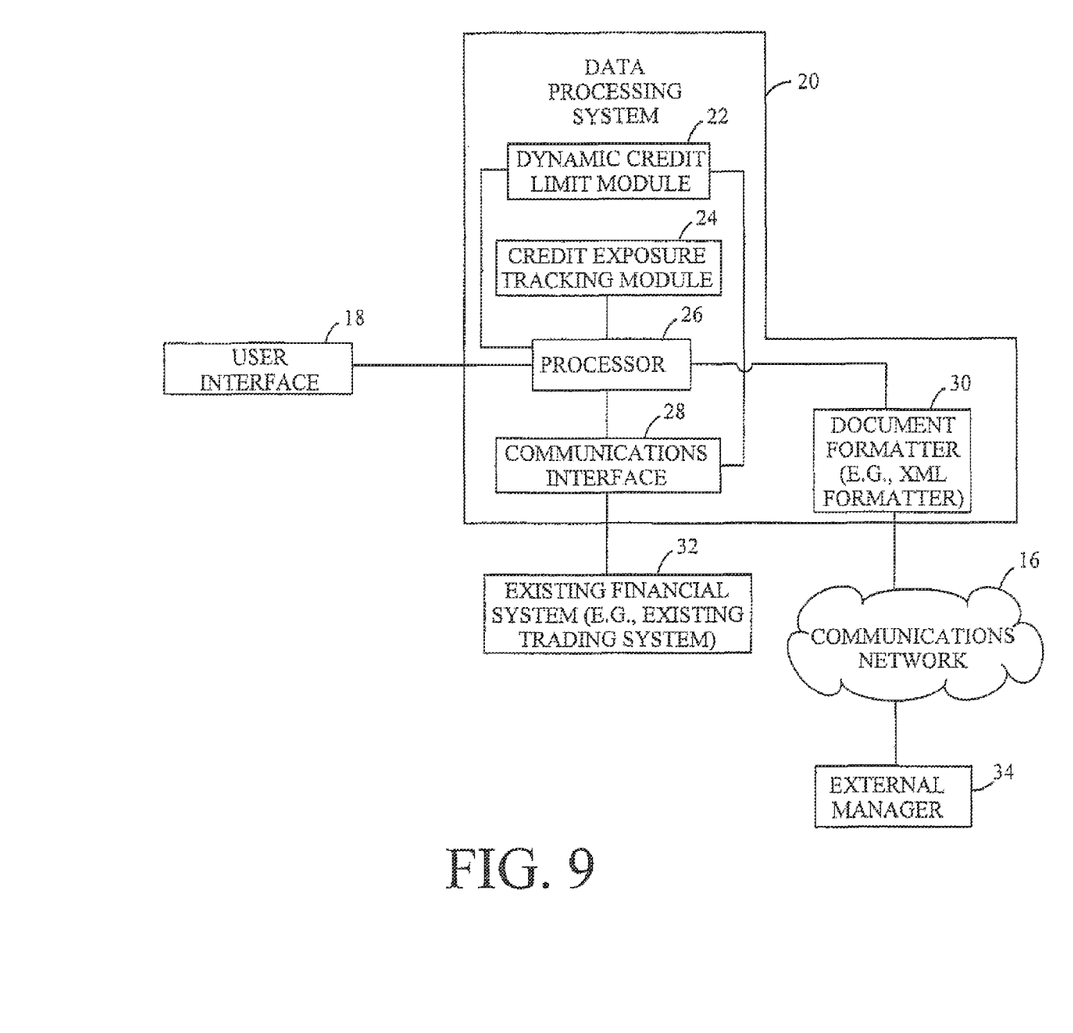
FIG. 9 is an alternate embodiment of a financial system for providing a financial evaluation in accordance with the invention.

FIG. 9 represents an alternate embodiment of the financial system of FIG. 1. The financial system of FIG. 9 is similar the financial evaluation system of FIG. 1, except the financial system of FIG. 9 is not coupled to the counterparty data source 12 and the debt market data source 14 via the communications network 16. Like reference numbers in FIG. 1 and FIG. 9 indicate like elements.

In FIG. 9, the data processing system 20 of FIG. 9 receives input data, such as market data and dynamic credit quality data, via the user interface 18. For example, the data processing system 20 may receive values for one or more of the following variables: M, V, N, $\sigma$, C, $C_{Avg}$, $C_{Min}$, and X via the user interface 18. The user interface 18 may comprise one or more of the following: a graphical user interface, a keyboard, a display, a pointing device, an optical drive, a disk drive, a reader for reading an optical storage medium, and a reader for reading a magnetic storage medium.

In one embodiment, a user enters input data or a file containing input data into the user interface 18. For example, a user may enter counterparty credit quality data by date and by counterparty identifier. The inputted file may contain one or more of the following types of input data: market data, reference data, and counter-party quality credit data for one or more counter-parties. Reference data includes generally static data, which may be revised less frequently than market data or counter-party credit quality data. The inputted file may be organized as a batch file (e.g., an extensible mark-up file) which contains reference data and counterparty data applicable to a time interval (e.g., an entire day).

Although the financial evaluation of the invention is primarily described with respect to a counterparty, a financial evaluation of the invention is well-suited for managing credit risk associated with one or more of the following: a counterparty, an industry sector, a country, and a defined portfolio. A party or counterparty can reduce the need for bad debt provisions or reserves where losses can be predicted more accurately. The dynamic credit supports precise and timely provision of credit quality information such that a party can manage credit exposure much closer to the dynamic credit limit or another preferential credit limit than would otherwise be possible. Accordingly, in accordance with the invention dynamic credit management may facilitate an expanded or broader customer base for debt financing activities. Customers with less than investment-grade credit ratings or on the fringes of investment grade credit ratings may be added to the customer base to provide a broader customer base with the improved financial modeling of dynamic credit management.

A dynamic credit limit (D) eliminates or reduces the need to hold reserves or capacity in investment grade debt to cover the uncertainty for other debt instruments in the portfolio. The dynamic credit limit supports industry-sector diversification across different industry sectors to reduce risk.

The foregoing description of the invention describes several illustrative embodiments. Other embodiments, variations, alterations or alternatives may fall within the scope of the invention and the following claims. Accordingly, the claims should be accorded the broadest interpretation possible consistent with the specification set forth in the description.

What is claimed is:

1. A system for providing a financial evaluation of at least one financial instrument, the system comprising:
   a processor;
   a communications module for receiving debt market data associated with a transaction of the financial instrument between a party and a counterparty and counterparty credit quality data associated with the transaction of the financial instrument between the party and the counterparty; and
   a dynamic credit limit module for determining a dynamic credit limit for the counterparty based on at least one of the counterparty credit quality data and the debt market data, the dynamic credit limit being defined in terms of a credit exposure versus time, and corresponding to a historical standard deviation of a credit cost of the counterparty over a defined time interval,
   wherein the dynamic credit limit module is communicatively coupled to the communications module, and wherein the dynamic credit limit module and the communications module are implemented as programmed instructions and disposed on computer readable media, and operable to be executed by the processor.

2. The system according to claim 1 wherein the debt market data comprises market liquidity data associated with the financial instrument and wherein the counterparty credit quality data is based on a debt rating of the counterparty.

3. The system according to claim 1 wherein the dynamic credit limit comprises a variable numerical credit exposure rating of the counterparty.

4. The system according to claim 1 further comprising:
   a credit exposure module for determining an actual credit exposure associated with the party; and
   wherein the credit exposure module comprises programmed instructions disposed on computer readable media, and operable to be executed by the processor to determine whether to engage in a financial transaction with the counterparty based on determining when the actual credit exposure associated with the party is less than the dynamic credit limit of the counterparty.

5. The system according to claim 1 wherein the dynamic credit limit is defined by the following equation:
   $D=M/(C+(N*\sigma))$, wherein D is the dynamic credit limit of the counterparty, M is the maximum risk exposure of the party, C is the credit cost of the party, N is a multiplier, and $\sigma$ is the historical standard deviation of C over a defined time interval.

6. The system according to claim 5 wherein C represents an average of the credit cost of the party over a historical time period.

7. The system according to claim 1 wherein the dynamic credit limit is defined by the following equation:

$$D=M/(V*(\text{Max}(C_{Min},C_{Avg})+N*\sigma)),$$

Where D is the dynamic credit limit of the counterparty, M is a maximum risk exposure of the party, V is a multiplicative factor, $C_{Min}$ is the minimum credit cost of the party, $C_{Avg}$ is a credit over a defined time interval, N is a multiplier, and $\sigma$ is a historical standard deviation of C over a defined interval.

8. The system according to claim 1 wherein the dynamic credit limit is operable for determining an unused credit capacity of the counterparty.

9. A system comprising:
   a processor;
   a first module for accessing debt market data associated with a transaction under review of a financial instrument between a party and a counterparty and counterparty credit quality data associated with the transaction under review between the party and the counterparty; and
   a second module for determining a dynamic credit limit for the counterparty based on at least one of the counterparty credit quality data and the debt market data, the dynamic credit limit being based on credit exposure versus time, and corresponding to a historical standard deviation of a credit cost of the counterparty over a defined time interval,
   wherein the first and second module are implemented as programmed instructions disposed on computer readable media, and operable to be executed by the processor.

10. The system of claim 9 wherein the debt market data comprises market liquidity data associated with the financial instrument and wherein the counterparty credit quality data is based on a debt rating of the counterparty.

11. The system of claim 9 wherein the dynamic credit limit comprises a variable numerical credit exposure rating of the counterparty.

12. The system of claim 9 further comprising:
   a third module, implemented as programmed instructions stored on computer readable memory and executed by the processor in the computing device, for determining an actual credit exposure associated with the party and for determining when the actual credit exposure associated with the party is less than the dynamic credit limit of the counterparty to decide whether to engage in a financial transaction with the counterparty.

13. The system of claim 9 wherein the dynamic credit limit is defined by the following equation:
   $D=M/(C+(N*\sigma))$, wherein D is the dynamic credit limit of the counter party, M is the maximum risk exposure of the party, C is the credit cost of the party, N is a multiplier, and $\sigma$ is the historical standard deviation of C over a defined time interval.

14. The system of claim 13 wherein C represents an average of the credit cost of the party over a historical time period.

15. The system claim 9 wherein the dynamic credit limit is defined by the following equation:

$$D=M/(V*(\text{Max}(C_{Min},C_{Avg})+N*\sigma)),$$

Where D is the dynamic credit limit of the counterparty, M is a maximum risk exposure of the party, V is a multiplicative factor, $C_{Min}$ is the minimum credit cost of the party, $C_{Avg}$ is a credit over a defined time interval, N is a multiplier, and $\sigma$ is a historical standard deviation of C over a defined interval.

16. The system of claim 9 wherein the second module determines an unused credit capacity of the counterparty based on the dynamic credit limit.

17. A data processing system comprising:
   a communications component for receiving debt market data associated with a transaction of the financial instrument between a party and a counterparty and counterparty credit quality data associated with the transaction of the financial instrument between the party and the counterparty;
   a dynamic credit limit component for determining a dynamic credit limit for the counterparty based on at least one of the counterparty credit quality data and the debt market data, the dynamic credit limit being defined in terms of a credit exposure versus time and corresponding to a historical standard deviation of a credit cost of the counterparty over a defined time interval; and a processor, communicatively coupled to the communications component and the dynamic credit limit component, the processor being operable to accept data from the communications component and the dynamic credit limit component.

18. The data processing system of claim 16 wherein the debt market data comprises market liquidity data associated with the financial instrument and wherein the counterparty credit quality data is based on a debt rating of the counterparty.

19. The data processing system of claim 16 wherein the dynamic credit limit comprises a variable numerical credit exposure rating of the counterparty.

20. The data processing system of claim 16 wherein the dynamic credit limit component determines an unused credit capacity of the counterparty based on the dynamic credit limit.

* * * * *